US011892347B2

(12) United States Patent
Adamson et al.

(10) Patent No.: US 11,892,347 B2
(45) Date of Patent: Feb. 6, 2024

(54) TECHNIQUES FOR LASER BEAM SENSING AND PROFILING USING TEMPERATURE-SENSITIVE STRUCTURES

(71) Applicant: RAM Photonics, LLC, San Diego, CA (US)

(72) Inventors: Per Adamson, Conesus, NY (US); Mike Cinquino, Conesus, NY (US); Joseph Lawson, Rochester, NY (US); Jordan Leidner, Brighton, NY (US)

(73) Assignee: RAM Photonics Industrial, LLC, Webster, NY (US)

( * ) Notice: Subject to any disclaimer, the term of this patent is extended or adjusted under 35 U.S.C. 154(b) by 0 days.

(21) Appl. No.: 17/716,818

(22) Filed: Apr. 8, 2022

(65) Prior Publication Data
US 2022/0326072 A1     Oct. 13, 2022

Related U.S. Application Data

(60) Provisional application No. 63/172,871, filed on Apr. 9, 2021.

(51) Int. Cl.
*G01J 1/02*     (2006.01)
*G01J 1/42*     (2006.01)

(52) U.S. Cl.
CPC ........... *G01J 1/0252* (2013.01); *G01J 1/4257* (2013.01)

(58) Field of Classification Search
CPC .......... G01J 1/0252; G01J 1/4257; G01J 1/50; G01K 2213/00; G01K 11/165
USPC ........................................................ 250/216
See application file for complete search history.

(56) References Cited

U.S. PATENT DOCUMENTS

| 5,526,148 A * | 6/1996 | Moffat ................. G01K 11/165 349/20 |
| 5,615,052 A | 3/1997 | Doggett |
| 8,210,741 B2 * | 7/2012 | Hamann ................. H01L 23/34 374/29 |
| 10,226,770 B2 * | 3/2019 | Kimball ................. C12P 19/34 |
| 2004/0031272 A1 | 2/2004 | Mecherle et al. |

(Continued)

OTHER PUBLICATIONS

Application No. PCT/US2022/024053 , "Invitation to Pay Additional Fees and, Where Applicable, Protest Fee", dated Jun. 13, 2022, 2 pages.

(Continued)

*Primary Examiner* — Que Tan Le
*Assistant Examiner* — Mai Thi Ngoc Tran
(74) *Attorney, Agent, or Firm* — KILPATRICK TOWNSEND & STOCKTON LLP

(57) ABSTRACT

A system for determining the profile of a laser beam includes a detector having a thermochromic liquid crystal film (TLCF) in thermal communication with a heat spreader and a thermoelectric cooler. The liquid crystal film has a thermochromic response such that heating of the film by a received laser beam creates a detectable color response at the film. The system also includes an image sensor and a controller configured to output an operating current for the TEC and receive images from the sensor. The system can selectively vary the temperature set point of the TEC to change the steady state temperature of the TLCF to examine the full intensity profile of the received beam even when the temperature response bandwidth of the TLCF is too narrow to display the full beam profile in a single color spot.

16 Claims, 10 Drawing Sheets

(56) References Cited

U.S. PATENT DOCUMENTS

| | | | |
|---|---|---|---|
| 2006/0241225 A1 | 10/2006 | Bielek et al. | |
| 2015/0372448 A1* | 12/2015 | Connolly | H01S 1/02 |
| | | | 372/20 |
| 2016/0329681 A1 | 11/2016 | Tulip | |
| 2018/0237820 A1 | 8/2018 | Martini et al. | |

OTHER PUBLICATIONS

Stasiek et al., "Thermochromic Liquid Crystals Applied for Heat Transfer Research", Opto-Electronics Review, vol. 10, No. 1, 2002, pp. 1-10.
Application PCT/US2022/024053 received an International Search Report and Written Opinion dated Aug. 17, 2022, 12 pages.
International Patent Application No. PCT/US2022/024053, "International Preliminary Report on Patentability", dated Oct. 19, 2023, 6 pages.

* cited by examiner

TECHNIQUES FOR LASER BEAM SENSING AND PROFILING USING TEMPERATURE-SENSITIVE STRUCTURES

CROSS-REFERENCE TO RELATED APPLICATIONS

This application claims the benefit of U.S. Provisional Application No. 63/172,871, filed Apr. 9, 2021, the contents of which are hereby incorporated by reference in their entirety for all purposes.

BACKGROUND OF THE INVENTION

Laser beams are characterized by a high spectral coherence and narrow spectral profiles. For spatially coherent laser beams, the beam can be focused to form a small, intense spot in a highly concentrated area. The spatial profile and the spatial coherence of the laser beam impacts energy density at the focus spot among other optical properties.

Despite the progress made in characterizing laser beam profiles, there is a need in the art for improved methods and systems related to laser beam sensing and profiling.

SUMMARY OF THE INVENTION

Embodiments of the present invention relate to detection of laser beams within an optical system. More particularly, some embodiments provide methods and systems useful in the visual detection of a laser beam using thermally-sensitive materials in thermal contact with a controllable cooler. The thermally-sensitive material, which can be referred to as a thermally-sensitive structure or thermally-sensitive interface, can be used to provide a visual indication in response to local heating, for instance by a received laser beam. This visual indication can be used as a proxy for the beam spot and can be imaged to determine characteristics of the beam profile. The controllable cooler can be used to limit the heat buildup at the thermally-sensitive interface in order to prevent saturation and thermal diffusion due to prolonged heating by the laser beam. By controlling the cooling provided by the controllable cooler, the laser beam detection system is able to provide a tunable scan of the two-dimensional intensity profile of the laser beam.

In some embodiments, the thermally-sensitive material can be a thermochromic liquid crystal film (TLCF) that produces a characteristic color-temperature profile in the film in response to heating caused by an impinging laser beam. Because the operational response band of the TLCF can be limited to a temperature range narrower than the range of temperatures associated with heating caused by the laser beam, and because the beam may impinge on the detector for a prolonged period, embodiments of the present invention utilize techniques to moderate heat buildup at the thermally-sensitive material.

According to an embodiment of the present invention, a system for detecting a laser beam is provided. The system includes a controller operable to provide a series of electrical signals for controlling a thermoelectric cooler. The thermoelectric cooler has a hot side and a cold side. The system also includes a heat spreader having a first surface and a second surface, the heat spreader in thermal communication with the thermoelectric cooler. The heat spreader can be removably coupled to the cold side of the thermoelectric cooler. The system also includes a temperature-sensitive structure in thermal communication with the heat spreader and configured to receive the laser beam.

The thermal communication between the heat spreader and the thermoelectric cooler may be achieved with an interface between the second surface of the heat spreader and the cold side of the thermoelectric cooler. In an example, the interface may be defined by physical contact. In another example, the interface may include a thermally conductive adjunct disposed between the second surface of the heat spreader and the cold side of the thermoelectric cooler. The thermally conductive adjunct may be a thermally conductive compound or a thermally conductive sheet.

According to another embodiment of the present invention, a laser beam detector is provided. The laser beam detector includes a heat spreader and a temperature-sensitive structure in thermal communication with a cooling surface of the heat spreader. The temperature-sensitive structure can comprise a plurality of TLCFs, with each TLCF of the plurality of TLCFs having an operating temperature band. In certain implementations, the temperature sensitive structure can have a first TLCF of the plurality of TLCFs adjacent to a second TLCF of the plurality of TLCFs. Other implementations can include three, four, or more TLCFs positioned adjacent to form a grid, an array, or other suitable arrangement of TLCFs on the cooling surface of the heat spreader.

According to a specific embodiment of the present invention, a method for detecting a laser beam is provided. The method includes receiving, at a thermochromic interface of a detector, a laser beam characterized by a beam intensity profile; selecting a temperature set point for the detector; capturing an image of the thermochromic interface; determining, from the image, a partial intensity profile corresponding to at least a portion of the beam intensity profile; and assembling a reconstructed beam profile using the partial intensity profile. The method can determine whether the reconstructed beam profile is complete. The method also includes selecting updated temperature set points for the detector; capturing additional images of the thermochromic interface; determining, from the additional images, additional partial intensity profiles; and assembling the reconstructed beam profile using the additional partial intensity profiles. The complete reconstructed beam profile is output.

According to another specific embodiment of the present invention, a method for aligning a laser beam within an optical system is provided. The method includes receiving a laser beam at a thermochromic interface of a detector and selecting a temperature set point for the detector. The thermochromic interface can include a thermochromic liquid crystal film. The temperature set point corresponds to an operating temperature of the detector. The method also includes capturing an image of the thermochromic interface and determining, from the image, one or more parameters corresponding to a current alignment of the laser beam with respect to an optical system. Based at least in part on the one or more parameters, the alignment of the laser beam with respect to the optical system is updated. The one or more parameters includes a beam profile asymmetry, a beam astigmatism, a beam occlusion, a beam aberration, or a beam wander.

The method can further include selecting updated temperature set points for the detector and capturing additional images of the thermochromic interface. From the additional images, one or more updated parameters corresponding to the updated alignment can be determined. The method also includes aligning the laser beam to obtain subsequent alignments and determining that one of the subsequent alignments corresponds to a final alignment. The final alignment can correspond to one or more final parameters. Determining that one of the subsequent alignments corresponds to the final alignment can include determining that at least one of the one or more updated parameters matches at least one of the one or more final parameters.

Many benefits are achieved by way of the present invention over conventional techniques. Conventional beam profilers typically include CMOS, CCD, or microbolometer detectors, which are relatively fragile and can require significant attenuation of high-power beams, for example, beams of $CO_2$ lasers, prior to impingement on the CMOS, CCD, or microbolometer detectors to avoid damaging the detectors. Attenuating the beams may require additional equipment and can introduce misalignment of the beam path and the beam profile. Moreover, these detectors can be expensive to replace in the event of damage resulting from an improperly attenuated beam. TLCFs and thermo-electric coolers (TECs), by contrast, are relatively inexpensive. A damaged TLCF can be readily replaced, and a TEC can be configured to receive, pump, and dissipate substantial thermal power without damage. Selecting the operating temperature of the detectors provided by embodiments of the present invention enables the ability to profile a variety of laser beams and beam intensities without additional configuration of the optical system. For example, the same detector used to determine the beam profile can also be used to rapidly detect and correct the misalignment of various types and powers of laser beams. Conventional beam viewing cards do not provide a selectable temperature control to view the beam center and control for thermal diffusion in the detector material, preventing the detection of optical effects that may only be visible at the beam center. These, and other embodiments of the present invention, along with many of its advantages and features, are described in more detail in conjunction with the text below and attached figures.

BRIEF DESCRIPTION OF THE DRAWINGS

Aspects of the present disclosure now will be described more fully hereinafter with reference to the accompanying drawings, which are intended to be read in conjunction with both this summary, the detailed description and any preferred and/or particular embodiments specifically discussed or otherwise disclosed. The various aspects may, however, be embodied in many different forms and should not be construed as limited to the embodiments as set forth herein; rather, these embodiments are provided by way of illustration only and so that this disclosure will be thorough, complete, and will fully convey the full scope to those skilled in the art.

DETAILED DESCRIPTION OF SPECIFIC EMBODIMENTS

Figure 1:
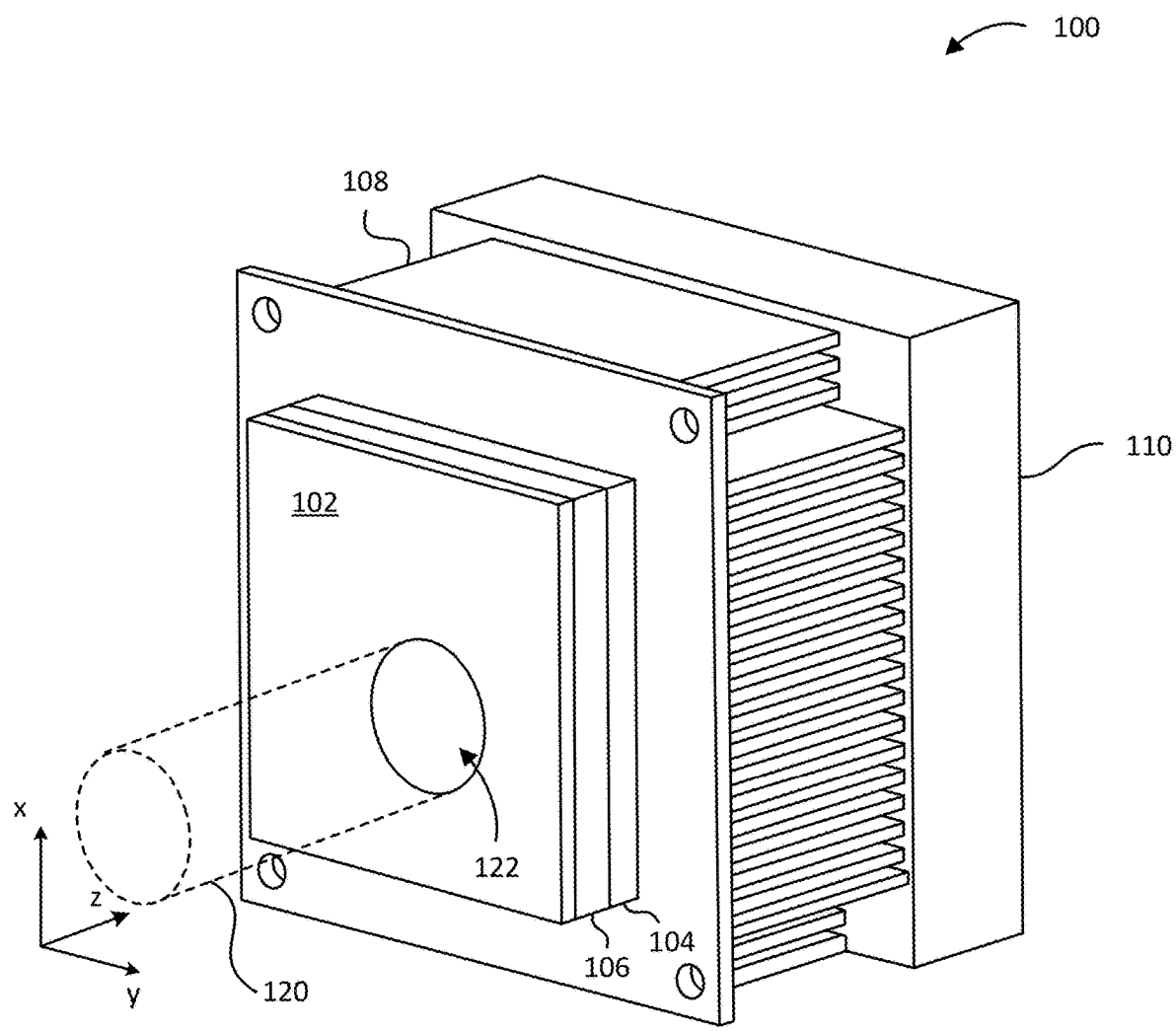
FIG. 1 is a simplified perspective drawing of a laser beam detector incorporating a thermochromic film in thermal communication with a thermoelectric cooler, according to some embodiments.

FIG. 1 is a simplified perspective drawing of a laser beam detector incorporating a thermochromic film in thermal communication with a thermoelectric cooler, according to some embodiments. As shown in FIG. 1, a laser beam detector 100 can include a thermochromic liquid crystal film (TLCF) 102 in thermal communication with a thermoelectric cooler (TEC) 104, according to some embodiments. The TLCF 102 can receive a laser beam 120 at an outward oriented surface. The resulting absorption of the beam by the TLCF can cause heating of a portion of the TLCF 102, resulting in a color spot 122 corresponding to the laser beam 120. The TLCF 102 can be affixed to the surface of a heat spreader 106 via a thermally conductive adhesive. In some embodiments, the TLCF 102 can be affixed to the heat spreader 106 via mechanical restraints (not shown) like spring clips, brackets, clamps, or other restraints configured to hold the TLCF 102 against the surface. Mechanical restraints can allow for quick removal and replacement of TLCF 102 in cases where a different TLCF is desired. In some embodiments, the TLCF 102 can be replaced by other temperature-sensitive structures exhibiting a thermochromic response, including thermal paper or another sheet containing, for example, a leuco dye or similar thermochromic material.

TLCFs are typically composed of microencapsulated liquid crystal ink deposited in a layer 10-50 μm thick. Below a characteristic minimum temperature $T_{min}$, the film does not selectively reflect wavelengths in the visible spectrum, appearing black if mounted on an absorbing background. Above $T_{min}$, the film will begin to selectively reflect light beginning with red wavelengths and moving through green and blue wavelengths as the temperature increases. At a characteristic maximum temperature $T_{max}$, the selective reflection stops. The film can then appear black again. The temperatures from $T_{min}$ to $T_{max}$ can define an operating temperature band for the TLCF. The operating temperature band can alternately be defined as the range between the temperature at which the first detectable red light component is reflected to the temperature at which the first detectable blue light component is reflected. The temperature dependence between $T_{min}$ and $T_{max}$ can be modeled by a sigmoidal function, an arctangent function, or other response function, such that the TLCF exhibits decreased temperature resolution near $T_{min}$ and $T_{max}$ while having an approximately linear response for temperature values in the middle of the range. Commonly available TLCFs have the liquid crystal film deposited on a thin plastic substrate with a second thin plastic layer over the top, creating a flexible package for the TLCF 102. The substrate can further include an opaque backing layer and an adhesive layer for mounting the TLCF 102 in a desired location, including at a cooling surface of the heat spreader 106.

Figure 3A:
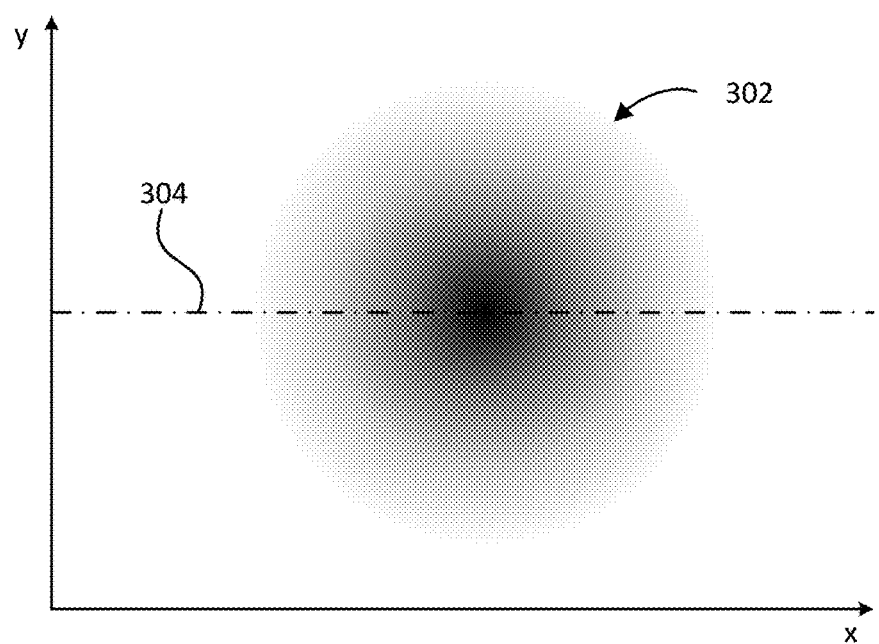
FIG. 3A illustrates the intensity of a laser beam in a plane perpendicular to the propagation direction of the beam, according to some embodiments.

The laser beam 120 can have an optical intensity profile in the plane transverse to its propagation direction. The transverse plane can be the x-y plane, such that the propagation direction of the laser beam is in the z direction. The intensity profile can take many forms, including a Gaussian profile, a flat-top profile, a mode profile including higher order transverse electromagnetic (TEM) modes, or other shapes. The intensity profile can depend on the particular laser, the laser application, and/or the optical system through which the laser beam propagates. By way of example, some of the embodiments discussed herein utilize a $TEM_{00}$ mode beam with a Gaussian profile as an exemplary laser beam 120 as shown in FIG. 3A.

As the laser beam impinges on the TLCF 102, heating of the TLCF 102 results from the impingement of the laser beam. The energy deposition of an absorbed beam at a material interface is proportional to the intensity of the beam. The heating of the TLCF 102 can result in a temperature profile of the TLCF 102 that is proportional to the intensity profile of the laser beam and results in the creation of the corresponding color spot 122. In general, the color spot 122 will have a similar "profile" as the impinging beam, so that the spot 122 has a similar color gradient as depicted in the grayscale FIG. 3A but can include effects from thermal conduction within the TLCF so that the Gaussian character of the profile is altered. Accurate calibration of the thermochromic response of the TLCF and its color gradient as well as appropriate thermal management via the TEC 104 can allow for the reconstruction of the beam profile in the presence of effects like thermal diffusion or non-linear thermochromic response near the edges of the operating temperature band of the TLCF.

Returning once again to FIG. 1, the heat spreader 106 can be a thermally conductive plate, for example a metal plate, comprising an outward facing cooling surface and a mounting surface opposite the cooling surface. Similarly, the TEC 104 can include a hot side and a cold side opposite the hot side. The heat spreader 106 can be attached to the cold side of the TEC 104 such that the mounting surface of the heat spreader 106 covers all or substantially all of the cold side. The typical operation of the TEC 104 is to transfer heat from the cold side to the hot side. Because the heat spreader 106 is thermally conductive, the operation of the TEC 104 will thus transfer heat from the heat spreader 106 to the hot side of the TEC 104. Although shown to be congruent with the cold side of the TEC 104, in some embodiments, the heat spreader 106 can extend past the edges of the TEC 104 to create a cooling surface of the heat spreader 106 that is larger than the cold side of the TEC 104. The heat spreader 106 can be connected to the TEC 104 in various ways, including mechanical compression, a thermally conductive adhesive, a solder mount, or the like. Mechanical compression can be achieved by threaded fasteners (not shown) passing through a portion of the heat spreader 106 that extends past the edge of the TEC 104 and engaging with threaded holes in a backing mount, for example a heat sink 108. The interface between the cold side of the TEC 104 and the heat spreader 106 can include a thermally conductive compound or thermally conductive sheet to improve surface contact between the two components and ensure sufficient heat transfer capability. As with the TLCF 102, in some embodiments the heat spreader 106 can be attached to the TEC 104 via a mechanism that allows for quick removal and replacement of the heat spreader 106, including a heat spreader with an attached TLCF 102. This mechanism can include spring clips, locking lever clips, or other retention clips that are configured to restrain the heat spreader 106 and apply a compressive force against the cold side of the TEC 104 while engaged.

Depending on the intensity of the laser beam 120, the TEC 104 may be able to dissipate sufficient heat at the hot side without additional passive or active cooling mechanisms, for example when used in conjunction with low intensity lasers that do not deposit significant thermal energy at the TLCF 102. Some lasers will produce substantial heating at the TLCF 102 and require additional methods to dissipate heat from the hot side of the TEC 104. As depicted, the TEC 104 can be attached to the heat sink 108, which can be a large thermally conductive block with radiative fins and/or other thermally dissipating structures. The heat sink 108 can be further connected to a fan 110 to provide active cooling by blowing ambient air through the fins of the heat sink to increase heat dissipation from the heat sink 108. The fan is oriented to provide air from the back side of the heat sink 108, such that the air is forced down into the fins and then channeled out the sides of the heat sink 108.

Other methods of active cooling are contemplated. For example, the heat sink 108 can be a thermal block with heat pipes or other structures containing working fluid passing through, such that the heat pipes are thermally coupled to another cooling mechanism like a water cooler, vapor change cooler, a heat pump, or other external cooling mechanism. Thus, in other embodiments, liquid (e.g., water) cooling of the heat sink 108 can be utilized depending on the thermal dissipation specification. In some embodiments, particularly those in which the laser beam detector 100 is to be positioned manually within an optical system, the heat sink 108 can be configured to be significantly thinner than depicted in FIG. 1, with the fan 110 mounted along one side of the heat sink 108 instead of at the back side as shown. In this configuration, the fan 110 can blow air through fins of the heat sink 108 in a direction transverse to the mounting surface of the heat sink 108. The position of the fan 110 at the side and a thinner heat sink 108 can result in substantially thinner detector that is more easily maneuverable by hand within an optical system without sacrificing the active cooling provided by fan 110.

Figure 2:
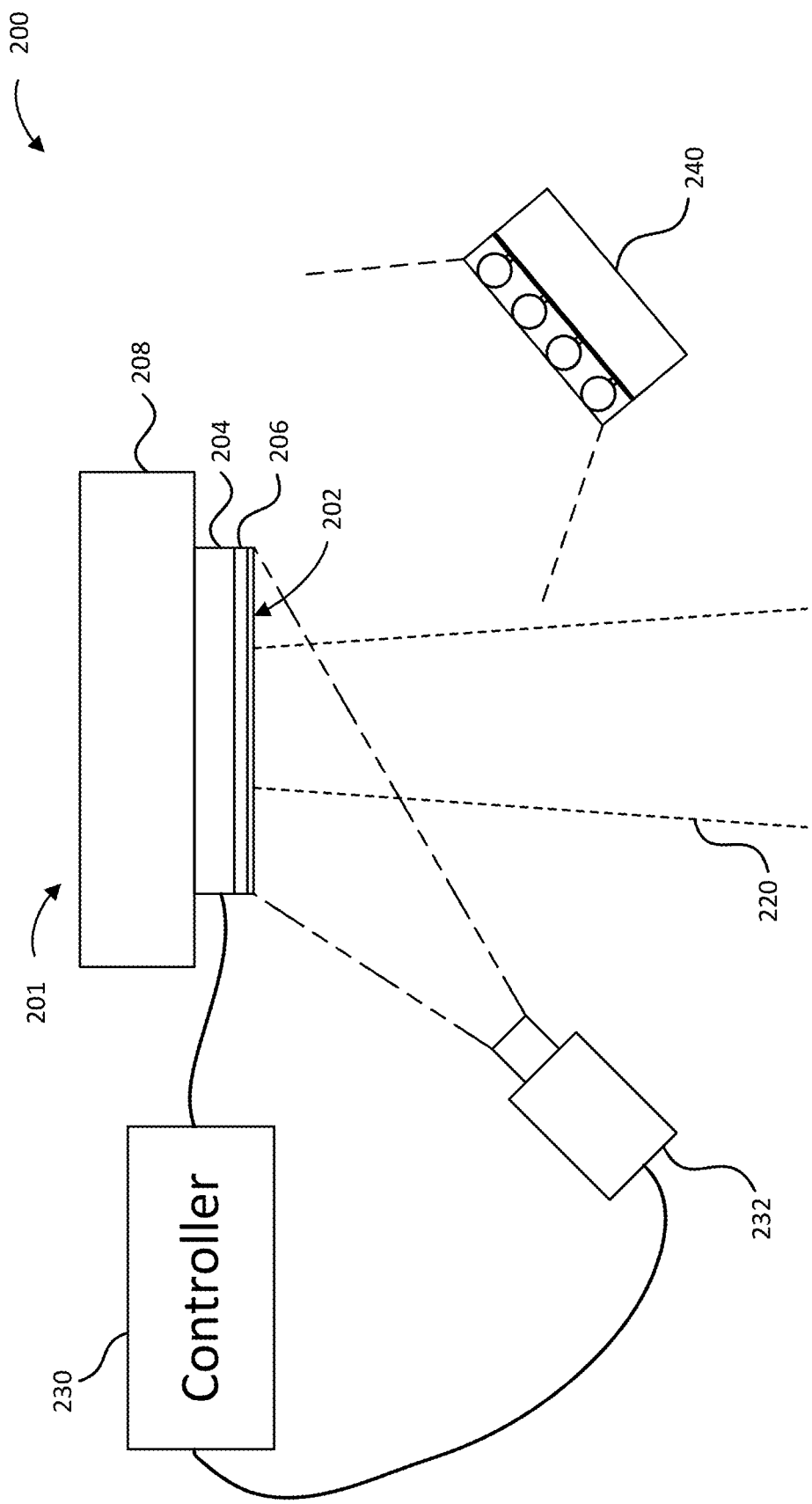
FIG. 2 is a schematic diagram of a system for detecting a laser beam, according to some embodiments.

FIG. 2 is a schematic diagram of a system for detecting a laser beam, according to some embodiments. As shown in FIG. 2 a system 200 can include a detector 201. The detector 201, which can be implemented as laser beam detector 100 in FIG. 1, can include a temperature-sensitive structure 202, a heat spreader 206, a TEC 204, and a heat sink 208. These elements may be similar to corresponding elements of the detector 100 described with reference to FIG. 1. For example, the temperature-sensitive structure 202 may be implemented as the TLCF 102, the heat spreader 206 may be similar to the heat spreader 106, the TEC 204 may be similar to the TEC 104, and the heat sink 208 may be similar to the heat sink 108. The TEC 204 can include a hot side and a cold side opposite the hot side. The detector 201 can be configured to receive a laser beam 220 at a surface of the temperature-sensitive structure 202. The surface can be a sensing interface of the detector 201.

The TEC 204 can be connected to a controller 230, which can include a power source for the TEC 204. The power source can be a controllable DC current source that can output electrical signals, including a stable, selected current, to the TEC 204 to enable the transfer of heat from the cold side to the hot side. Each selected current corresponds to a heat transfer rate across the TEC. Namely, a higher selected current increases the rate of heat transfer such that the cold side of the TEC achieves a lower steady state (e.g., equilibrium) temperature. Thus, in the absence of a strong heat source at the cold side of the TEC, each selected current will cause the cold side to reach a particular steady state temperature, with higher currents corresponding to colder temperatures at the cold side. The steady state temperature can be an operating temperature of the detector 201. The temperature-sensitive structure 202 is in thermal communication with the cold side of the TEC 204 via the heat spreader 206 and any intermediary thermal conduction adjuncts like thermally conductive compounds or a thermally conductive sheet, so that the operating temperature of the detector 201 will be the steady state temperature of the temperature-sensitive structure 202 in the absence of a heat source.

When the laser beam 220 impinges on the temperature-sensitive structure 202, the structure will be locally heated in a region corresponding to a diameter of the laser beam. The locally heated region can then create a color spot on the temperature-sensitive structure 202. Continuing the example from above, the laser beam 220 can be a laser beam having a Gaussian beam profile. Although a Gaussian beam will have non-zero intensity throughout the plane transverse to its propagation direction, most of the intensity of the laser beam is confined within a finite, identifiable diameter of the Gaussian beam. This diameter can correspond to the full width at half maximum (FWHM) intensity, the $1/e^2$ diameter (i.e., the beam waist), or another commonly defined beam diameter. For a given operating temperature, the beam intensity in a region outside of the beam diameter may be insufficient to heat the temperature-sensitive structure above a minimum operating temperature $T_{min}$. However, thermal diffusion effects may cause heating in the region outside the beam diameter due to heating at the center of the beam. In these cases, control of the operating temperature via the input current to the TEC 204 can limit diffusion by providing sufficient heat transfer away from the plane of the temperature-sensitive structure 202.

In some embodiments, the system 200 can include a camera 232 or other imaging system to record the color spot produced at the temperature-sensitive structure 202 of the detector 201. The camera 232 can include a color RGB imaging sensor and can be positioned at location away from a beam path of the laser beam 220. The imaging sensor can be any of several known sensors, including CCDs or CMOS sensors and/or other optical sensors. The camera 232 can be connected to the controller 230, such that the controller 230 can receive, store, and process images obtained using the imaging sensor. In these embodiments, the controller 230 can be a computer configured to communicate with and control the camera 232 as well as the power supply for the TEC 204. Image processing can include correcting for the position of the imaging sensor relative to the surface of the temperature-sensitive structure 202 as well as identifying a hue within the color space of the sensor and determining a corresponding temperature at the temperature-sensitive structure 202 based on the thermochromic response of the temperature-sensitive structure 202. In addition, in some embodiments, the controller 230 can be configured to detect, based on images received from the camera 232, whether the color spot produced at the temperature-sensitive structure 202 has saturated the color gradient of the temperature-sensitive structure 202 and then select a new output current for the TEC 204 so that the operating temperature of the detector 201 is changed to eliminate the saturation. In other embodiments, the controller 230 can be configured to sweep through a series of output currents for the TEC 204 and receive an image from the camera 232 at each corresponding operating temperature.

In some other embodiments, the camera 232 can include a monochrome imaging sensor or other similar sensor. In these embodiments, the images produced by the camera 232 may be monochromatic (e.g., grayscale) and represent intensity information of the light reflected from the temperature-sensitive structure 202. The controller 230 can be configured to determine saturation of the color spot of the temperature-sensitive structure 202 based on the monochromatic images in the absence of hue or other color information.

In some embodiments, the temperature-sensitive structure 202 can be a TLCF, such that the detector system 200 can further include an illuminator 240. Because TLCFs selectively reflect distinct wavelengths of light at the liquid crystal structures, they utilize external illumination at visible wavelengths to create the perceived color spot. The illuminator 240 can output white light to provide a sufficient source for imaging the color spot at the camera 232. In other embodiments, the temperature-sensitive structure 202 can be a fluorescent structure that emits fluorescent emission and does not utilize an external source of light to emit light in response to a thermal effect. Such fluorescent structures may still use an external illumination source to be "charged" intermittently to allow for fluorescence in the presence of an impinging laser beam. In other embodiments, the illuminator 240 can be a monochromatic source or a swept monochromatic source such that only a single band of thermo-chromic response is recorded by the camera 232. The monochromatic source can be a single wavelength light emitting diode, a low power laser operating in the visible spectrum and with a different wavelength than the laser beam 120, a filtered white light source, or other suitable monochromatic illuminator.

As a specific example of the foregoing embodiments, consider the scenario in which the laser beam 220 is a Gaussian beam and a user wants to measure the beam's profile to determine the beam's characteristics. The system 200 can be configured to perform a measurement sequence of the intensity profile of the laser beam 220. The detector 201 can be configured to receive the laser beam 220 at a TLCF. The controller can select an output current for the TEC 204 corresponding to an operating temperature $T_0$. The operating temperature $T_0$ can correspond to an initial operating temperature in a sequence of operating temperatures. The initial operating temperature can be selected such that a temperature increase $\Delta T$ of the TLCF due to heating by the laser beam 220 does not exceed the maximum operating temperature $T_{max}$ of the TLCF, i.e., $T_0+\Delta T \leq T_{max}$. With the TLCF at the initial temperature, only the central portion of the laser beam 220 may have intensity sufficient to heat the TLCF into its operating temperature band. The controller 230 can then instruct the camera 232 to capture an image of the surface of the TLCF, including the color spot resulting from the local heating from the laser beam 220. The image can indicate that the color spot did not exceed the maximum temperature of the TLCF's operating temperature band, such that controller 230 can select the next temperature in the sequence and output the corresponding current to the TEC 204.

In some embodiments, the selected initial operating temperature may not be sufficiently low to prevent the temperature increase ΔT from exceeding $T_{max}$, i.e., $T_0+\Delta T \geq T_{max}$. In this scenario, the color spot at the TLCF may saturate in the region where $T_{max}$ is exceeded. If the first image does have saturation of the color spot, the controller 230 can reduce the operating temperature of the detector 201 and capture additional images until the peak of the beam is resolved in the color spot. Once a satisfactory initial image is captured, the operating temperature of the detector 201 can be increased at discrete intervals, with additional images of the TLCF surface captured at each subsequent operating temperature. Once the detector reaches a relatively high operating temperature, the TEC 204 may no longer be able to transfer heat away from the TLCF to prevent significant thermal diffusion within the plane of the LCF, causing the color spot to lose its distinct outer edge. The controller 230 can detect that the color spot is no longer distinguishable within the images captured by the camera 232 and stop the measurement sequence. In some embodiments, the sequence of operating temperatures can be predetermined. In others, an operator can manually tune the operating temperature to obtain images of the color spot at specific temperatures.

For each image captured by the camera 232, the controller 230 or other image processing system can identify the pixels with a hue or an RGB color component corresponding to the maximum and minimum operating temperatures, $T_{max}$ and $T_{min}$, within the TLCF's operating temperature band. The controller 230 can also identify pixels in sequential images that correspond to the same temperature of the TLCF. Since sequential images can have different operating temperatures, the identified pixels can correspond to regions of the TLCF where the temperature increase ΔT due to the laser beam 220 is equal to the difference in the operating temperature between the sequential images. As will be discussed in greater detail with respect to FIGS. 4A-4F, below, identifying corresponding pixels in sequential images can allow the system to combine the sequential images at those identified pixels to recreate a beam profile, for example, by coaligning the images at boundaries corresponding to the identified pixels.

For example, a first image could be taken with the operating temperature of the detector 201 set to 0° C. with the peak intensity of the received laser beam 220 creating a temperature rise of 25° C. at its center. If the TLCF has an operating temperature band of 20-25° C., the resulting color spot will just reach the maximum temperature at the center and fall away to an undetectable 20° C. some distance away from the center point, since the peripheral intensity of the beam may not be sufficient to heat the TLCF to more than 20° C. The operating temperature can be increased to 5° C. At this temperature, the beam center will still create a 25° C. rise at the LCF, but this will exceed $T_{max}$ of the TLCF and saturate the color gradient. The saturation will extend a distance from the beam center until the temperature drops below the detectable 25° C. $T_{max}$ threshold. The pixels at the saturation boundary registering a 25° C. temperature at the second operating temperature can correspond to the pixels registering 20° C. at the first operating temperature, and thus correspond to the same intensity value of the beam profile. The profiles can then be combined at the location of the corresponding pixels to create a reconstructed beam profile.

FIG. 3A illustrates the intensity of a laser beam in a plane perpendicular to the propagation direction of the beam, according to some embodiments. As shown in FIG. 3A, a laser beam can have an intensity profile in a cross section 302 of the laser beam in the x-y plane transverse to its propagation direction. The beam depicted here has a Gaussian profile and can correspond to the laser beam 120 of FIG. 1. The intensity is plotted in grayscale, with darker points corresponding to higher intensity. As shown, the intensity is greatest at the center of a circular region and diminishes radially outward from the center. The dashed line 304 represents a line profile taken through the two dimensional cross section 302.

Figure 3B:
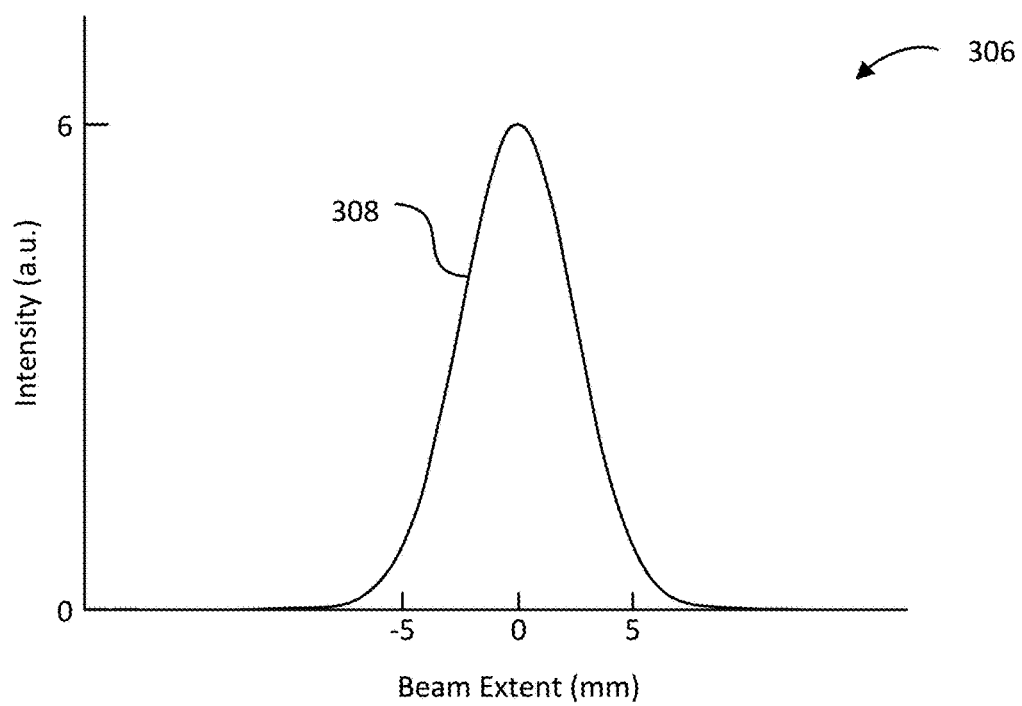
FIG. 3B is a plot illustrating an intensity profile in one dimension of the laser beam illustrated in FIG. 3A.

FIG. 3B is a plot illustrating an intensity profile in one dimension of the laser beam illustrated in FIG. 3A. The plot 306 includes an intensity profile 308 in one dimension of the laser beam illustrated in FIG. 3A. The intensity profile 308 corresponds to the dashed line 304. As can be seen, the intensity profile is Gaussian. Because the laser beam is axisymmetric, different line outs through the center of the two dimensional profile in FIG. 3A will create identical intensity profiles as intensity profile 308. The intensity, which is measured as a power per unit area ($W/m^2$), is plotted in arbitrary units to facilitate the following discussion. The profile 308 has a peak intensity of 6 arbitrary units and a $1/e^2$ diameter of 10 mm.

Figure 4A:
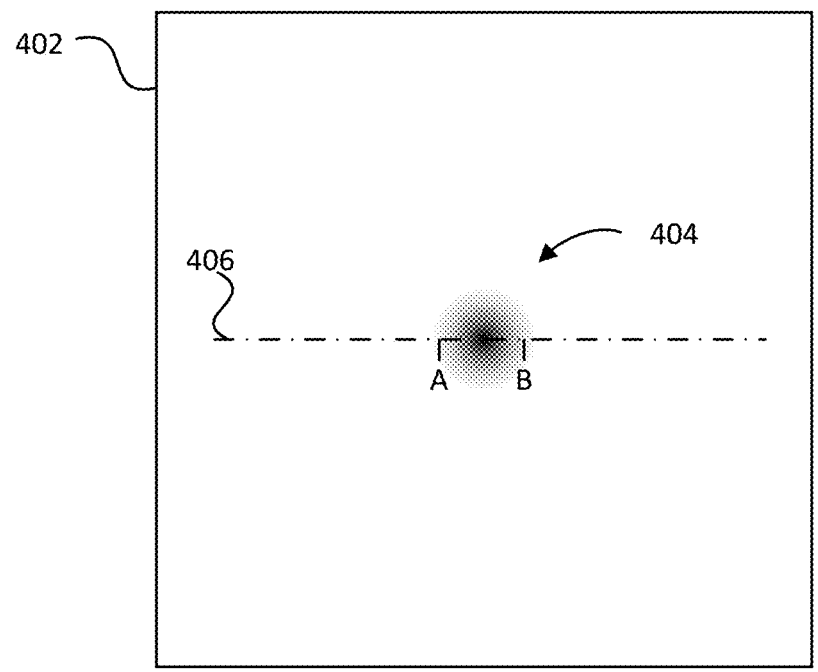
FIG. 4A is an illustration of a beam spot on a thermochromic interface of a laser beam detector operating at an initial temperature, according to some embodiments.
Figure 4B:
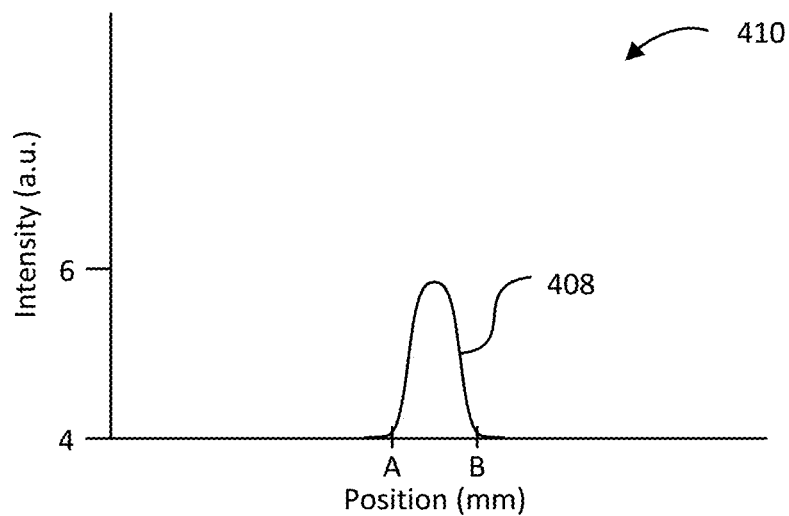
FIG. 4B is a plot illustrating an intensity profile in one dimension of the beam spot shown in FIG. 4A, according to some embodiments.
Figure 4C:
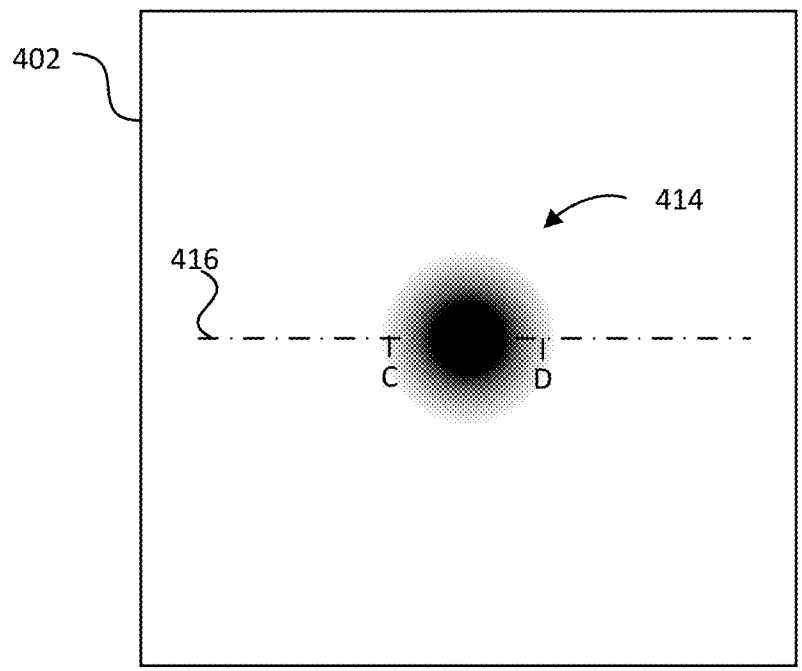
FIG. 4C is an illustration of a beam spot on a thermochromic interface of a laser beam detector operating at an intermediate temperature greater than the initial temperature, according to some embodiments.
Figure 4D:
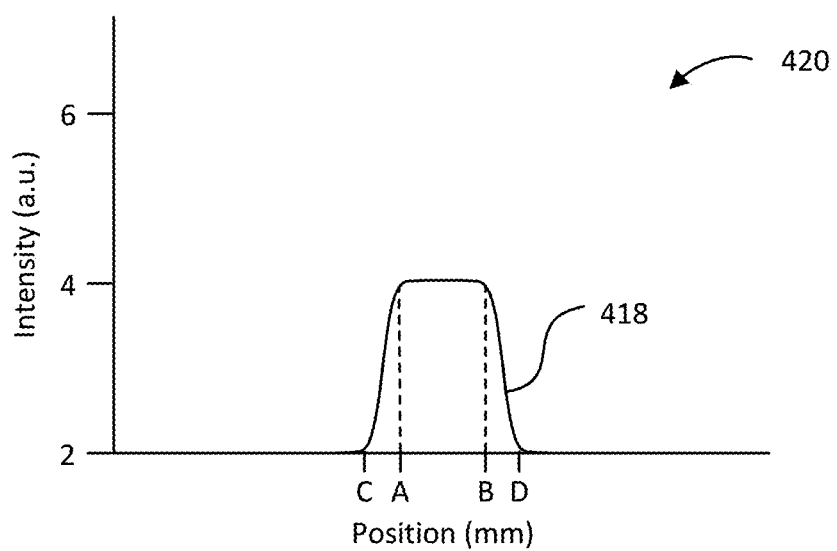
FIG. 4D is a plot illustrating an intensity profile in one dimension of the beam spot shown in FIG. 4C, according to some embodiments.
Figure 4E:
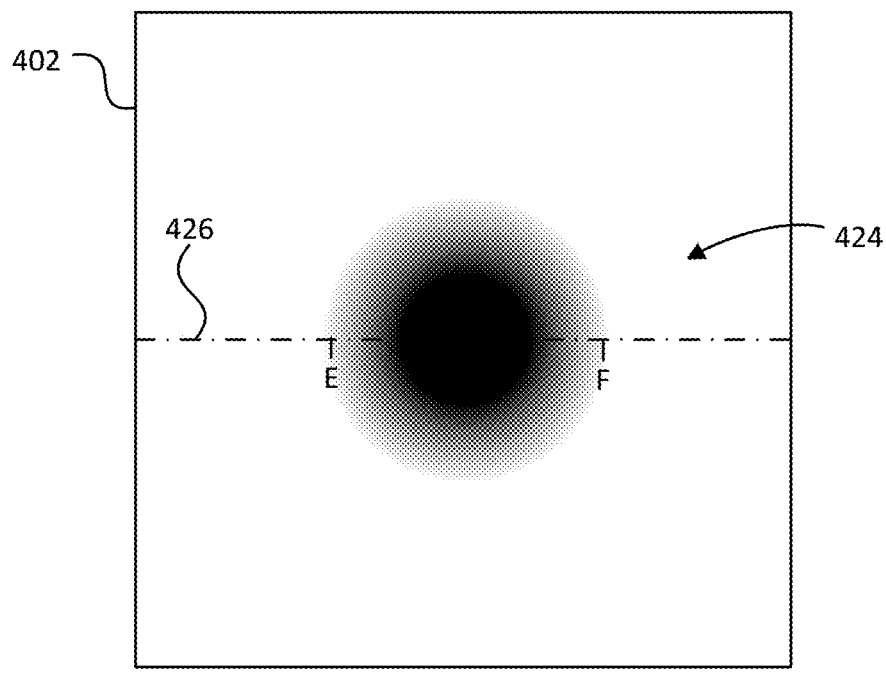
FIG. 4E is an illustration of the beam spot on a thermochromic interface of a laser beam detector operating at a final temperature greater than the intermediate temperature, according to some embodiments.
Figure 4F:
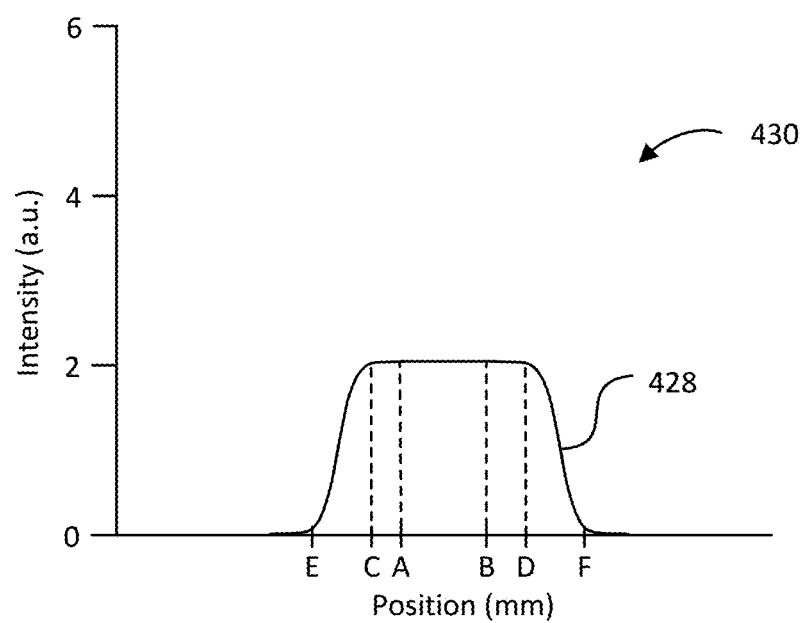
FIG. 4F is a plot illustrating an intensity profile in one dimension of the beam spot shown in FIG. 4E, according to some embodiments.

FIGS. 4A-4F depict a succession of example color spots at a thermochromic interface of a laser beam detector and corresponding computed intensity profiles obtained for a laser beam impinging on the thermochromic interface. FIGS. 4A and 4B correspond to the laser beam detector operating at an initial operating temperature. FIGS. 4C and 4D correspond to the laser beam detector operating at an intermediate operating temperature greater than the initial operating temperature. FIGS. 4E and 4F correspond to the laser beam detector operating at a final operating temperature greater than the intermediate operating temperature.

FIG. 4A is an illustration of a beam spot on a thermochromic interface of a laser beam detector operating at an initial temperature, according to some embodiments. As shown in FIG. 4A, a laser beam may impinge on a thermochromic interface 402 of a laser beam detector operating at an initial temperature, creating a color spot 404. The laser beam detector may be similar to the laser beam detector 100 of FIG. 1 or detector 201 of FIG. 2. In some embodiments, the thermochromic interface 402 can be a TLCF. The laser beam received at the thermochromic interface 402 can be the laser beam with intensity cross section 302 and intensity profile 308 of FIGS. 3A and 3B. The color spot 404 is depicted in grayscale such that a darker gray or black color of the spot corresponds to the colors representing higher temperatures in the thermochromic response of the thermochromic interface 402, with black indicating a temperature exceeding the $T_{max}$ of the interface material and white indicating a temperature below the $T_{min}$ of the interface material. The initial operating temperature of the detector can be represented by $T_0$, and may be sufficiently low to only allow the center of the beam to heat the thermochromic interface 402 sufficiently to be in the operating temperature band. For example, $T_0=0°$ C., while $T_{min}=20°$ C. and $T_{max}=25°$ C.

Points A and B represent the furthest extent from the beam center that is within the operating temperature band of the thermochromic material and correspond to points with a temperature of $T_{min}$. As depicted, points A and B can occur at approximately 1.7 mm and −1.7 mm from the beam center, where the negative value indicates a distance away from the beam center to the left along the plot position axis.

An image of the thermochromic interface 402 can be captured with an RGB sensor or other color sensor so that the color spot 404 can be mapped to RGB pixels indicating the measured temperature values according to the response curve of the interface material. Dashed line 406 indicates the path along which a line out of a portion of the intensity represented by the color spot 404 is computed, wherein the temperature values of each point along the dashed line 406 have been converted to a corresponding intensity value of the laser beam creating the heating at the thermochromic interface 402.

FIG. 4B is a plot illustrating an intensity profile in one dimension of the beam spot shown in FIG. 4A, according to some embodiments. As shown in FIG. 4B, a plot 410 can include an intensity profile 408 of the color spot 404. The intensity profile 408 is determined along dashed line 406. The points A and B are identified in the plot 410 and are the same points A and B depicted on the thermochromic interface 402. Depending on the configuration of the laser beam detector and the characteristics of the thermochromic interface 402, thermal diffusion may result in a detected profile that is not Gaussian. Correction and approximation techniques can be used to adjust the detected profile in accordance with a model of the underlying thermal processes. As shown here, the profile is presented in arbitrary units and has been shifted to fit between 4 and 6 to represent the peak intensity of the received beam.

Referring to FIG. 4C, the operating temperature of the laser beam detector can be increased such that additional portions of the received laser beam are within the operating temperature band of the thermochromic interface 402. The operating temperature can be designated $T_1$ and is greater than the initial temperature $T_0$ described with respect to FIG. 4A, according to some embodiments. For example, $T_1=5°$ C., while the operating temperature band of the interface remains 20-25° C. Similar to the description above, points C and D can represent the points on the thermochromic interface 402 at Tin, such that the color spot 414 is not detectable beyond these points. Because the operating temperature of the detector has been increased, the heating near the beam center now exceeds $T_{max}$ in a region illustrated by the solid black interior of the color spot 414. Since the difference between $T_1$ and $T_0$ (i.e., 5° C. in this example) is the same as the operating temperature band of the thermochromic interface, the edge of the saturated region of the color spot 414 can correspond to points A and B from FIG. 4A, which are now at $T_{max}$. Dashed line 416 represents the same line along which an intensity profile is computed when processing an image of the thermochromic interface 402.

FIG. 4D is a plot illustrating an intensity profile in one dimension of the beam spot shown in FIG. 4C, according to some embodiments. A shown, a plot 420 includes an intensity profile 418 computed along dashed line 416 of the color spot 414 shown in FIG. 4C. The profile 418 has a distinctly flat top where the color spot 414 has saturated. The information lost due to the saturation can be recovered using intensity profile 408 obtained at operating temperature $T_0$. Points A and B indicate the corresponding points where the temperature is $T_{max}$. Points C and D are the same points C and D along dashed line 416 in FIG. 4C and correspond to points where the temperature is $T_{min}$. Points C and D occur at approximately 3.3 mm and −3.3 mm from the center of the beam spot.

Referring to FIG. 4E, the operating temperature of the detector can be increased further such that the remaining detectable portions of the received laser beam are within the operating temperature band of the thermochromic interface 402. The operating temperature can be designated $T_2$ and is greater than temperature $T_1$ described with respect to FIG. 4C, according to some embodiments. For example, $T_2=10°$ C., while the operating temperature band of the interface remains 20-25° C. As before, points E and F can represent the points on the thermochromic interface 402 at $T_{min}$ when the detector is operating at $T_2$, such that the color spot 424 is not detectable beyond these points. Because the operating temperature of the detector has been increased even further, the heating near the beam center now exceeds $T_{max}$ in a large saturation region. The difference between $T_2$ and $T_1$ is again the same as the operating temperature band of the thermochromic interface. The edge of the saturated region of the color spot 424 can correspond to points C and D from FIG. 4C, which are now at $T_{max}$. Dashed line 426 represents the same line along which an intensity profile is computed when processing an image of the thermochromic interface 402.

FIG. 4F is a plot illustrating an intensity profile in one dimension of the beam spot shown in FIG. 4E, according to some embodiments. As shown in FIG. 4F, the plot 430 can include the intensity profile 428 computed along dashed line 426 of the beam spot shown in FIG. 4E. The intensity profile 428 has a significant portion that exceeds the $T_{max}$ of the interface response. Points C and D indicate the corresponding points where the temperature is $T_{max}$. Points E and F are the same points E and F along dashed line 426 in FIG. 4E and correspond to points where the temperature is $T_{min}$. Points E and F occur at approximately 5 mm and −5 mm from the center of the beam spot. Points A and B are the same as the points A and B shown in FIGS. 4A-4D and correspond to points within the saturation region of the intensity profile 428.

Figure 5:
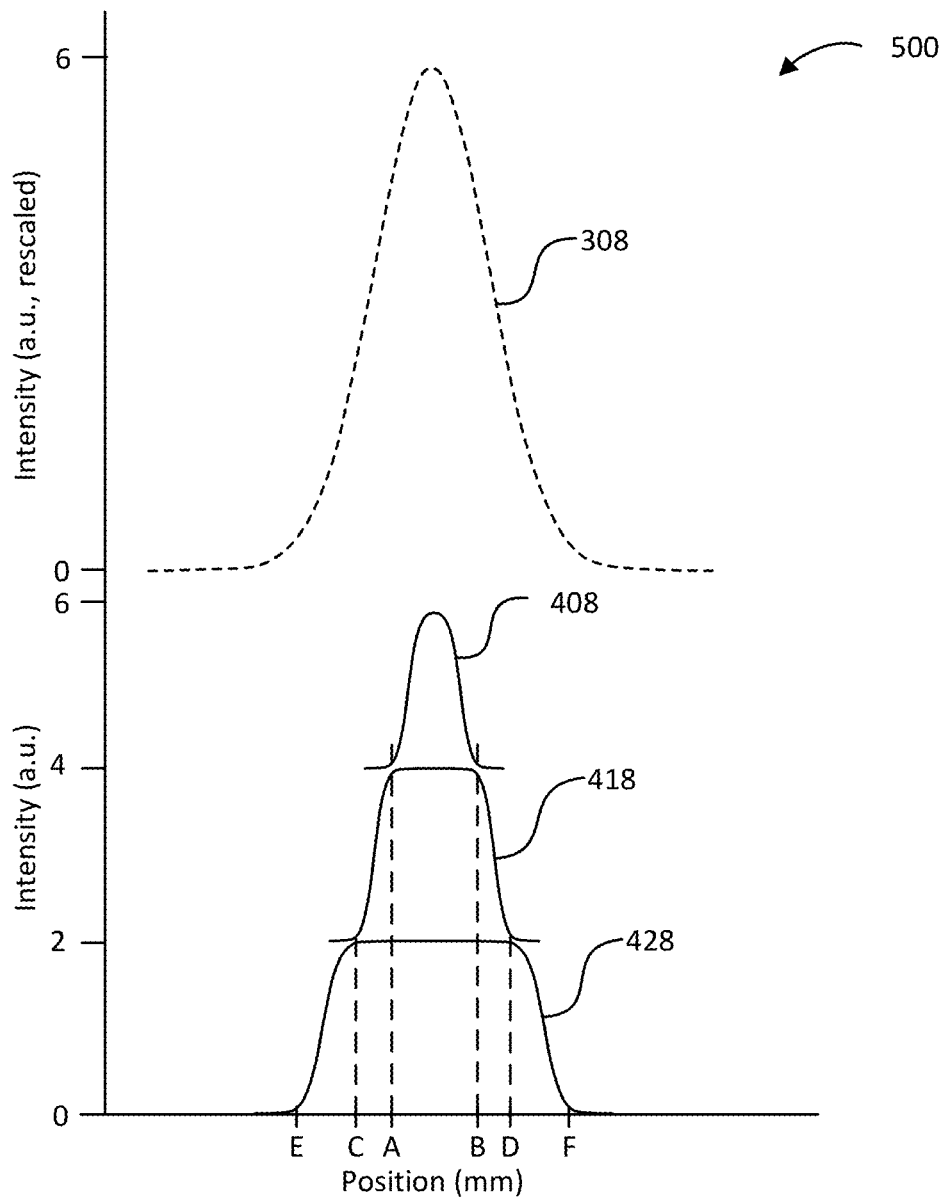
FIG. 5 is a set of plots illustrating a combination of the intensity profiles depicted in FIGS. 4B, 4D, and 4F to reconstruct the intensity profile of the laser beam shown in FIG. 3B.

FIG. 5 is a set of plots illustrating a combination of the intensity profiles depicted in FIGS. 4B, 4D, and 4F to reconstruct the intensity profile of the laser beam shown in FIG. 3B. As shown, the plot 500 includes a combination of the intensity profiles 408, 418, and 428 to reconstruct the intensity profile 308. The points A-F are the same as described above with respect to FIGS. 4A-4F and indicate the points on the profiles corresponding to either $T_{min}$ or $T_{max}$ of the thermochromic interface. To reconstruct a total beam profile, the recovered profiles are aligned and combined according to the identified points. The points A and B for intensity profiles 408, 418 are aligned, as are points C and D in intensity profiles 418, 428. Combining the profiles can include a summation of the profiles after shifting each profile to have the same zero value. Other techniques can be employed including weighted summation and least-squares curve fitting to account for deviations in the profiles from the expected Gaussian shape caused by known processes in the measurement apparatus (e.g., thermal diffusion "broadening" a saturated flat-top profile when operating at a high operating temperature of the TEC).

In some embodiments, the captured images of the interface at the selected operating temperatures are coaligned to create a two dimensional image of the total temperature profile of the laser beam. The coalignment can be based on determining pixels in successive images that correspond to the same temperature after accounting for the change in operating temperature of the detector. It may be desirable to coalign the images rather than combining individual intensity profiles because the alignment may have greater fidelity with a larger number of corresponding alignment pixels, rather than the two point alignment depicted in FIG. 5. For example, an image of the thermochromic interface operating at $T_0$ may have a ring of pixels corresponding to values of $T_{max}$, while an image of the interface operating at $T_1$ may have a similarly sized ring of pixels corresponding to $T_{min}$. Aligning the two images using techniques that include information from all the pixels in the rings can improve alignment of the images to construct a more accurate intensity measurement. After aligning all of the images collected for the selected operating temperatures, an intensity profile can be computed across a chosen line through the total image. One of ordinary skill in the art would recognize many variations, modifications, and alternatives.

Figure 6:
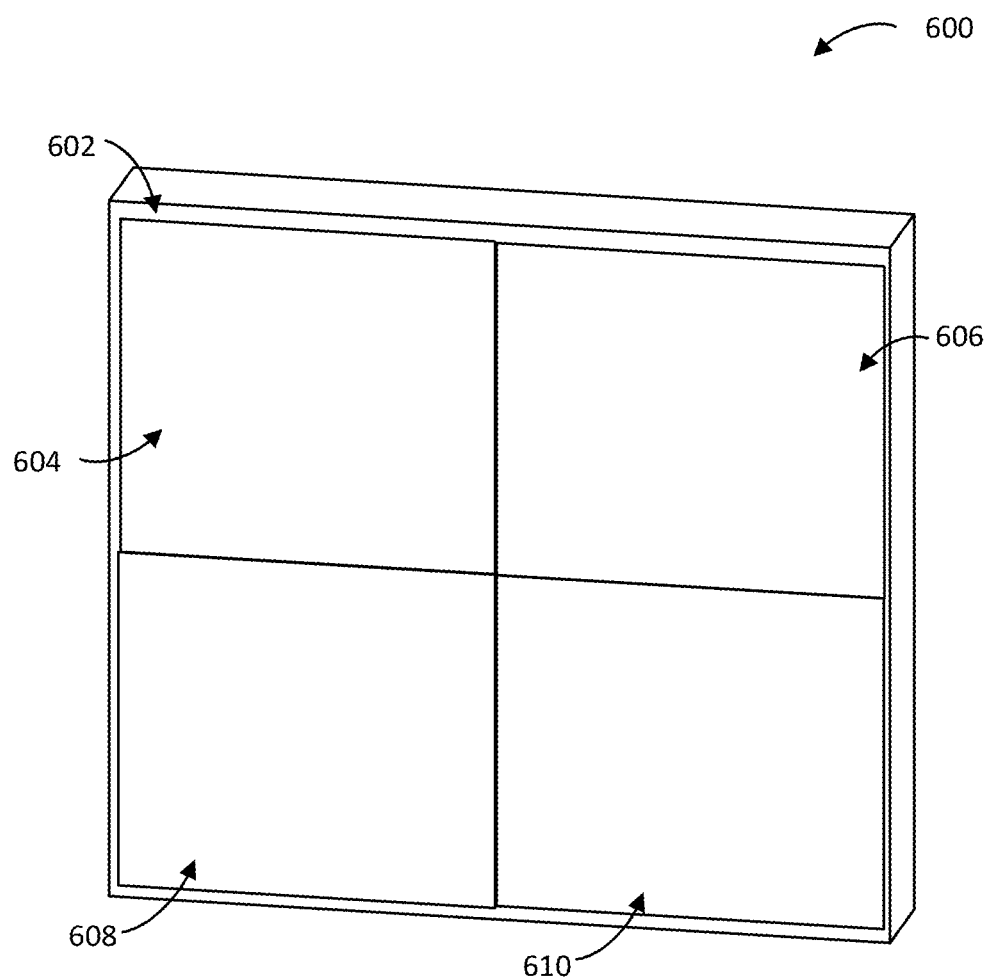
FIG. 6 is a simplified diagram of four different thermochromic sheets affixed to the surface of a heat spreader, according to some embodiments.

FIG. 6 is a simplified diagram of four different temperature sensing sheets affixed to a surface of a heat spreader, according to some embodiments. As shown in FIG. 6 the temperature sensing sheets can be attached to a surface 602 of a heat spreader 600. The heat spreader 600 may be similar to other heat spreaders discussed herein, including heat spreaders 106 and 206 of FIGS. 1 and 2, respectively. The temperature sensing sheets can be TLCFs with different operating temperature bands. For example, the operating temperature band of TLCF 604 can be 20-25° C., TLCF 606 can be 20-21° C., TLCF 608 can be 25-30° C., and TLCF 610 can be 20-30° C. Numerous other combinations of operating temperature bands are possible. The TLCFs 604-610 can be affixed to the surface 602 by a thermally conductive adhesive or by mechanical restraints. In some embodiments, the array can include two, three, or more than four temperature sensing sheets. The arrangement of the sheets can include grid patterns, radial patterns, or other suitable patterns.

Arraying multiple thermal sensing structures on a single heat spreader can provide a number of advantages. Because most laser beams are axisymmetric, an array of TLCFs at a detector interface can capture a symmetric portion of the beam at each TLCF simultaneously. The resulting beam spot would have different components corresponding to each of the TLCFs impinged by the beam. In the four-structure array of FIG. 6, for a centered laser beam, the beam spot would have a different component in each of the four quadrants covered by the four TLCFs 604-610. Capturing an image of the resulting spot would provide temperature information within four different operating temperature bands simultaneously. Appropriate selection of the TLCFs to create overlapping operating temperature bands with different bandwidths can improve image alignment when computing intensity profiles of the impinging laser beam. In addition, the added information from multiple TLCFs can make the scan through different operating temperatures of the detector more efficient by reducing the number of operating temperatures needed to capture the full beam profile.

In some embodiments, the array of multiple sensing structures can enable efficient inspection of the beam profile at each structure separately. For example, an operator could use a detector incorporating the heat spreader 600 to verify the alignment of a laser beam within an optical system. The operator can select an operating temperature for a detector, such that each of the four TLCFs 604-610 will operate at that temperature at steady state. The operator can then place the detector into the path of a laser such that the beam impinges at only one TLCF at a time. For instance, the operator could begin by centering the beam within TLCF 604 to create a color spot according to the thermochromic response of TLCF 604. Instead of adjusting the operating temperature of the detector to view different beam profile information, the operator can move the detector so that the beam is centered in the next LCF, for instance, TLCF 606 that has a different operating temperature band than TLCF 604. Such a technique is useful when making alignment adjustments to the beam in the optical system when quick changes to the temperature sensitivity of the detector are desired without adjusting a power source to a TEC.

Figure 7:
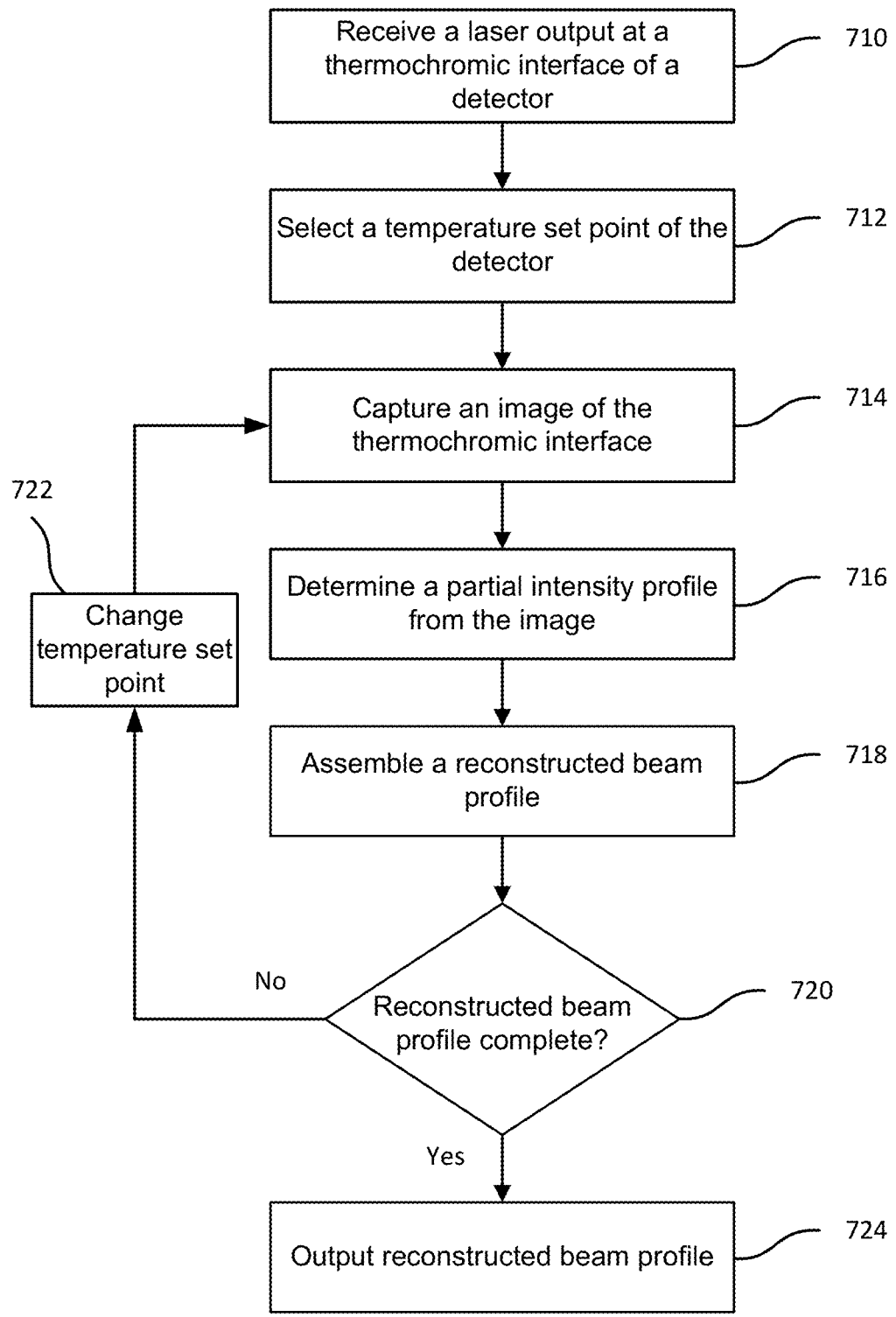
FIG. 7 is a flowchart illustrating a method of reconstructing a laser beam profile using images of a thermochromic interface affixed to a controllable cooler, according to some embodiments.

FIG. 7 is a flowchart illustrating a method of reconstructing a laser beam profile using images of a thermochromic interface affixed to a controllable cooler, according to some embodiments. The process illustrated can correspond to one or more of the techniques described above with reference to FIGS. 3-5. The process can be performed by a detector system like the one described with reference to FIG. 2. As illustrated in FIG. 7, the method of reconstructing a beam profile utilizes an iterative loop representing the acquisition of images of the thermochromic interface of a detector for different temperature set points. The thermochromic interface of a detector can receive the laser beam, where the laser beam is characterized by a beam intensity profile (710). An initial temperature set point of the detector can be selected (712). The temperature set point can correspond to an operating temperature of the controllable cooler configured to be in thermal communication with the thermochromic interface, such that the operating temperature is the steady state temperature of the thermochromic interface. The controllable cooler can be a TEC according to certain embodiments.

The laser beam can cause local heating of the thermochromic interface, creating a color spot based on selectively reflected wavelengths of visible light. An imaging sensor or other imaging system can capture an image of the thermochromic interface (714). In some embodiments, the thermochromic interface may be illuminated with light in the visible spectrum to provide light to for the selective reflection at the thermochromic interface. From the image, a partial intensity profile corresponding to at least a portion of the beam intensity profile can be determined. The determination can be performed by a controller or other suitable computing system for image analysis. The partial intensity profile can correspond to a line profile taken along a line through the image of the thermochromic interface.

The partial intensity profile can be used to assemble a reconstructed beam profile (718). A single partial intensity profile may not be sufficient to reconstruct the complete beam profile. If the reconstructed beam profile is not complete (720), then updated temperature set points for the detector can be selected (722). Additional images of the thermochromic interface can be captured and additional partial intensity profiles can be determined from the updated images. The additional partial intensity profiles can then be used with the partial intensity profile to assemble the reconstructed beam profile. The assembly can include alignment of the partial intensity profiles based on the intensity values corresponding to the detected $T_{max}$ and $T_{min}$ of the thermochromic interface. In some embodiments, the alignment can be based on intensity values corresponding to detected temperatures within a linear region of the characteristic thermochromic response of the interface.

Once the beam profile is complete, the reconstructed beam profile can be output (724). Whether the reconstructed beam profile is complete can be determined by examining a current reconstructed profile for sufficient definition of profile parameters, for example whether the reconstructed profile contains profile information at beam radial positions exceeding the $1/e^2$ diameter. Outputting the reconstructed beam profile can include storing data corresponding to the reconstructed beam profile, displaying the reconstructed beam profile, or other process for handling the data.

It should be appreciated that the specific steps illustrated in FIG. 7 provide a particular method of measuring an intensity profile of a laser beam according to an embodiment of the present invention. Other sequences of steps may also be performed according to alternative embodiments. For example, alternative embodiments of the present invention may perform the steps outlined above in a different order. Moreover, the individual steps illustrated in FIG. 7 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 8:
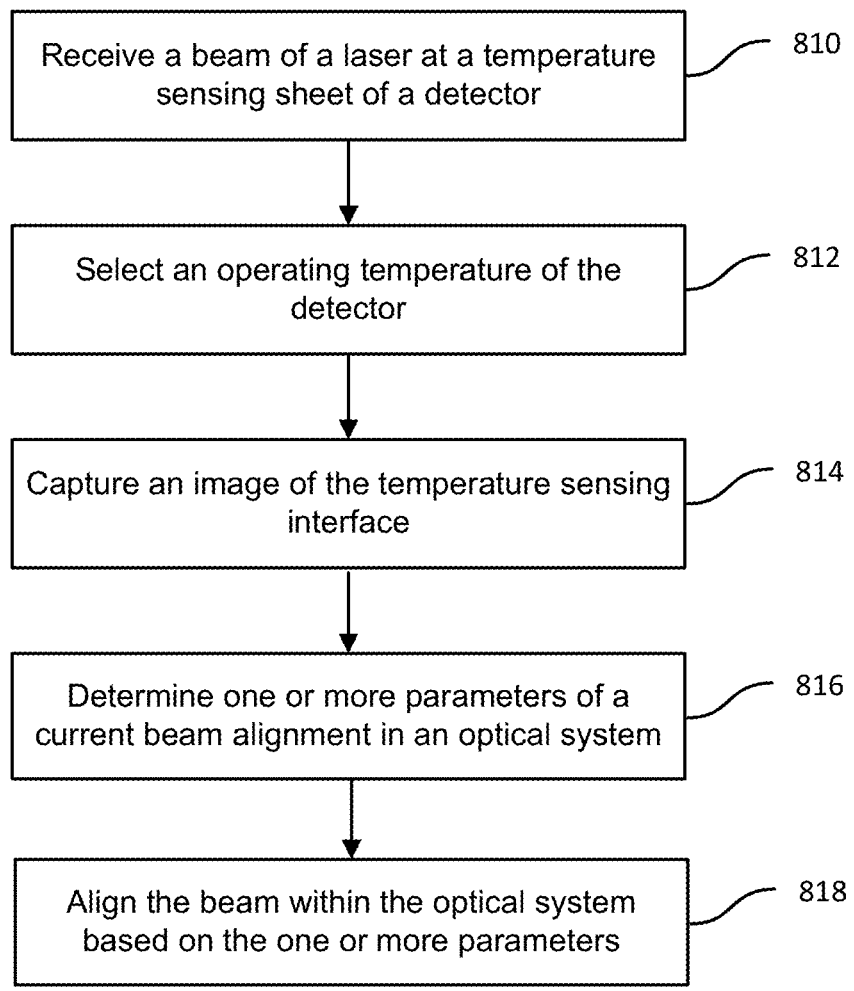
FIG. 8 is a flowchart illustrating a method of aligning a laser beam within an optical system using a detector having a thermochromic interface, according to some embodiments.

FIG. 8 is a flowchart illustrating a method of aligning a laser beam within an optical system using a detector having a thermochromic interface, according to some embodiments. The process illustrated can correspond to one or more of the techniques described above with reference to FIGS. 1 and 6. The process can be performed by a detector like the one described with reference to FIG. 1.

The detector can receive a laser beam at the thermochromic interface (810). In some embodiments, the thermochromic interface can be a TLCF. A temperature set point for the detector can be selected (812), for example, by a controller configured to operating a controllable cooler in thermal communication with the thermochromic interface. The temperature set point can correspond to an operating temperature of the detector.

The laser beam can cause local heating of the thermochromic interface, creating a color spot based on selectively reflected wavelengths of visible light. An imaging sensor or other imaging system can capture an image of the thermochromic interface (814). From the image, one or more parameters corresponding to a current alignment of the laser beam with respect to an optical system can be determined (816). The determination can be performed by a controller or other suitable computing system for image analysis. In some embodiments, the determination can be performed by an operator using a visual examination of the image. The one or more parameters can include a beam profile asymmetry, a beam astigmatism, a beam occlusion (e.g., a misaligned aperture), a beam aberration (e.g., coma) or other aberrations induced by optical elements within the optical system, a beam wander, or a beam jitter.

Based on the determined parameters, the beam can be aligned with respect to the optical system to obtain an updated alignment (818). Aligning the beam can be accomplished by adjusting one or more optical elements within the optical system, for example, by adjusting the orientation of a mirror or other reflector, adjusting the orientation of lens, removing an obstruction, etc.

In some embodiments, additional images at updated temperature set points can be captured to further refine the alignment of the beam with respect to the optical system. The process may be similar to the operations described above repeated iteratively until a desired alignment or final alignment for the laser beam is achieved. The final alignment can be characterized by having one or more final parameters desired for the laser beam. For example, the final alignment may be characterized by having no detectable occlusions or having a quantified asymmetry less than a threshold.

As an example of the above technique, in some embodiments, an operator can place the detector in the path of the laser beam and observe the beam spot at a high operating temperature of the detector showing the beam periphery in the operating temperature band of the TLCF. If an axisymmetric beam were partially obstructed at its periphery by an opaque edge of an object in the beam's path, the profile would be occluded and the resulting color spot at the TLCF would show an edge corresponding to the obstruction. The operator can correct the beam alignment in the optical system and observe the beam spot on the TLCF to confirm the correction. The operator can then lower the operating temperature of the detector so that the beam center is in the operating temperature band of the TLCF. If the beam is misaligned off the optical axis of the optical system, aberrations like coma can be observed in the color spot of the TLCF. Again, the operator can correct the beam alignment while observing the beam spot on the TLCF. Because the operating temperature of the detector can be changed rapidly, multiple alignment checks can be done quickly and efficiently at several locations in the optical system.

It should be appreciated that the specific steps illustrated in FIG. 8 provide a particular method of aligning a laser beam using a detector having a thermochromic interface according to an embodiment of the present invention. Other sequences of steps may also be performed according to alternative embodiments. For example, alternative embodiments of the present invention may perform the steps outlined above in a different order. Moreover, the individual steps illustrated in FIG. 8 may include multiple sub-steps that may be performed in various sequences as appropriate to the individual step. Furthermore, additional steps may be added or removed depending on the particular applications. One of ordinary skill in the art would recognize many variations, modifications, and alternatives.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein, the singular forms "a," "an," and "the" include plural references unless the context clearly dictates otherwise.

It is also understood that the examples and embodiments described herein are for illustrative purposes only and that various modifications or changes in light thereof will be suggested to persons skilled in the art and are to be included within the spirit and purview of this application and scope of the appended claims, which follow.

What is claimed is:

1. A system for detecting a laser beam, the system comprising:
　a controller comprising a processor and a memory;
　a thermoelectric cooler comprising a hot side and a cold side, the thermoelectric cooler operable to receive a series of electrical signals from the controller;
　a heat spreader comprising a first surface and a second surface, the heat spreader in thermal communication with the thermoelectric cooler; and
　a temperature-sensitive structure characterized by an operating temperature band and in thermal communication with the heat spreader, wherein the temperature-sensitive structure is configured to receive the laser beam, and wherein:
　　a region of local heating is produced on the temperature-sensitive structure in response to receiving the laser beam; and
　　the memory stores instructions that, when executed by the processor, cause the controller to:
　　　generate the series of electrical signals;

cause the thermoelectric cooler to transfer heat from the cold side to the hot side; and maintain temperatures of the region within the operating temperature band.

2. The system of claim 1 wherein the heat spreader is removably coupled to the cold side of the thermoelectric cooler.

3. The system of claim 1 further comprising an interface between the second surface of the heat spreader and the cold side of the thermoelectric cooler.

4. The system of claim 3 wherein the interface is defined by physical contact.

5. The system of claim 3 wherein the interface is defined by a thermally conductive adjunct disposed between the second surface of the heat spreader and the cold side of the thermoelectric cooler.

6. The system of claim 1 wherein the series of electrical signals corresponds to a series of equilibrium temperatures of the cold side of the thermoelectric cooler.

7. The system of claim 1 wherein the temperature-sensitive structure includes a temperature sensing sheet characterized by a thermochromic response, the temperature sensing sheet comprising a liquid crystal film.

8. The system of claim 1 wherein the laser beam is defined by a beam path, the system further comprising an optical sensor disposed at a location off of the beam path and configured to receive light reflected from the temperature-sensitive structure.

9. The system of claim 8 wherein the optical sensor is operable to transmit data to the controller, wherein the data corresponds the light received at the optical sensor.

10. The system of claim 9 wherein the controller is further configured to receive the data from the optical sensor and to select, based at least in part on the data, one of the series of electrical signals to provide to the thermoelectric cooler.

11. A laser beam detector comprising:
a controller comprising a processor and a memory;
a thermoelectric cooler comprising a hot side and a cold side, the thermoelectric cooler being operable to receive a series of electrical signals from the controller;
a heat spreader comprising a cooling surface and in thermal communication with the thermoelectric cooler; and
a temperature-sensitive structure in thermal communication with the heat spreader and configured to receive a laser beam, the temperature-sensitive structure comprising a plurality of thermochromic liquid crystal films, wherein each of the plurality of thermochromic liquid crystal films is characterized by a corresponding operating temperature band, and wherein:
a region of local heating is produced on the temperature-sensitive structure in response to receiving the laser beam; and the memory stores instructions that, when executed by the processor, cause the controller to:
generate the series of electrical signals;
cause the thermoelectric cooler to transfer heat from the cold side to the hot side; and
maintain temperatures of the region within the corresponding operating temperature band of at least one of the plurality of thermochromic liquid crystal films.

12. The laser beam detector of claim 11 further comprising:
a first thermochromic liquid crystal film of the plurality of thermochromic liquid crystal films, the first thermochromic liquid crystal film in contact with a first portion of the cooling surface; and
a second thermochromic liquid crystal film of the plurality of thermochromic liquid crystal films, the second thermochromic liquid crystal film in contact with a second portion of the cooling surface adjacent to the first portion.

13. The laser beam detector of claim 12 wherein the first thermochromic liquid crystal film is characterized by a first operating temperature band, and wherein the second thermochromic liquid crystal film is characterized by a second operating temperature band different from the first operating temperature band.

14. The laser beam detector of claim 13 further comprising:
a third thermochromic liquid crystal film of the plurality of thermochromic liquid crystal films, the third thermochromic liquid crystal film in contact with a third portion of the cooling surface adjacent to the first portion; and
a fourth thermochromic liquid crystal film of the plurality of thermochromic liquid crystal films, the fourth thermochromic liquid crystal film in contact with a fourth portion of the cooling surface adjacent to the second portion and the third portion.

15. The laser beam detector of claim 14 wherein the third thermochromic liquid crystal film is characterized by a third operating temperature band different from the first operating temperature band and the second operating temperature band, and wherein the fourth thermochromic liquid crystal film is characterized by a fourth operating temperature band different from the first operating temperature band, the second operating temperature band, and the third operating temperature band.

16. The laser beam detector of claim 11, wherein a portion of the region of local heating is produced within each of the plurality of thermochromic liquid crystal films.

\* \* \* \* \*